United States Patent
Moon et al.

(10) Patent No.: US 10,779,360 B2
(45) Date of Patent: Sep. 15, 2020

(54) CONTROL SIGNALING FOR FIFTH GENERATION CHANNEL STATE INFORMATION REFERENCE SIGNALS (XCSI-RS)

(71) Applicant: Intel IP Corporation, Santa Clara, CA (US)

(72) Inventors: Sungho Moon, San Jose, CA (US); Bishwarup Mondal, San Jose, CA (US); Yushu Zhang, Beijing (CN); Jong-Kae Fwu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 11 days.

(21) Appl. No.: 16/070,916

(22) PCT Filed: May 18, 2016

(86) PCT No.: PCT/US2016/033019
§ 371 (c)(1),
(2) Date: Jul. 18, 2018

(87) PCT Pub. No.: WO2017/142573
PCT Pub. Date: Aug. 24, 2017

(65) Prior Publication Data
US 2019/0029071 A1 Jan. 24, 2019

Related U.S. Application Data (60) Provisional application No. 62/297,040, filed on Feb. 18, 2016.

(51) Int. Cl.
*H04W 88/06* (2009.01)
*H04W 72/04* (2009.01)
(Continued)

(52) U.S. Cl.
CPC .......... *H04W 88/06* (2013.01); *H04B 7/0617* (2013.01); *H04B 7/0626* (2013.01);
(Continued)

(58) Field of Classification Search
None
See application file for complete search history.

(56) References Cited

U.S. PATENT DOCUMENTS

2012/0176939 A1* 7/2012 Qu .................... H04L 5/0023
370/255
2015/0341092 A1 11/2015 Park et al.
(Continued)

FOREIGN PATENT DOCUMENTS

EP 2608598 A1 6/2013

OTHER PUBLICATIONS

International Search Report dated Oct. 21, 2016 for International Application PCT/US2016/033019.

*Primary Examiner* — Lonnie V Sweet
(74) *Attorney, Agent, or Firm* — Eschweiler & Potashnik, LLC (57) ABSTRACT

Techniques for configuration of a user equipment (UE) for fifth generation (5G) Channel State Information (xCSI) Reference Signals (xCSI-RS) are discussed. One example apparatus employable at a base station comprises a processor configured to schedule a fifth generation Physical Downlink Shared Channel (xPDSCH) during one or more xPDSCH symbols of a subframe n; schedule a final M symbols of the one or more xPDSCH symbols for fifth generation Channel State Information Reference Signals (xCSI-RS); and output one or more control messages to transmitter circuitry for transmission to one or more User Equipments (UEs), wherein the one or more control messages comprise a xCSI-RS configuration for the one or more
(Continued)

UEs, wherein the xCSI-RS configuration indicates the value of M and the final M symbols scheduled for xCSI-RS.

30 Claims, 7 Drawing Sheets

(51) Int. Cl.
*H04W 88/10* (2009.01)
*H04L 5/00* (2006.01)
*H04B 7/06* (2006.01)
*H04B 7/04* (2017.01)
*H04W 76/27* (2018.01)
*H04B 7/0417* (2017.01)

(52) U.S. Cl.
CPC .......... *H04B 7/0639* (2013.01); *H04L 5/005* (2013.01); *H04L 5/0057* (2013.01); *H04W 72/042* (2013.01); *H04W 76/27* (2018.02); *H04W 88/10* (2013.01); *H04B 7/0417* (2013.01); *H04L 5/0035* (2013.01); *H04L 5/0094* (2013.01)

(56) References Cited

U.S. PATENT DOCUMENTS

2016/0337178 A1* 11/2016 Frenne ................ H04L 41/0803
2018/0007688 A1*  1/2018 Fu .................... H04W 72/0406
2018/0132255 A1*  5/2018 Hessler ............. H04W 72/0406
2018/0219605 A1*  8/2018 Davydov ............ H04B 7/0862

\* cited by examiner

CONTROL SIGNALING FOR FIFTH GENERATION CHANNEL STATE INFORMATION REFERENCE SIGNALS (XCSI-RS)

REFERENCE TO RELATED APPLICATIONS

This application is a National Phase entry application of International Patent Application No. PCT/US2016/033019 filed May 18, 2016, which claims priority to U.S. Provisional Application 62/297,040 filed on Feb. 18, 2016, entitled "SYSTEMS AND METHOD FOR CSI-RS" in the name of Sungho Moon et al. and is hereby incorporated by reference in its entirety.

FIELD

The present disclosure relates to wireless technology, and more specifically to techniques for communicating control signaling for Channel State Information (CSI) in fifth generation (5G) systems.

BACKGROUND

Conventional LTE (Long Term Evolution) systems since LTE Release 10 (Rel. 10) have included the Channel State Information (CSI) Reference Signal (CSI-RS) among the reference signals transmitted by a base station (BS) such as an Evolved NodeB (eNB). A User Equipment (UE) can receive the CSI-RS from the eNB and estimate a channel quality information (CQI) and other parameters, which can be reported back to the eNB via a CSI Report.

DETAILED DESCRIPTION

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 1:
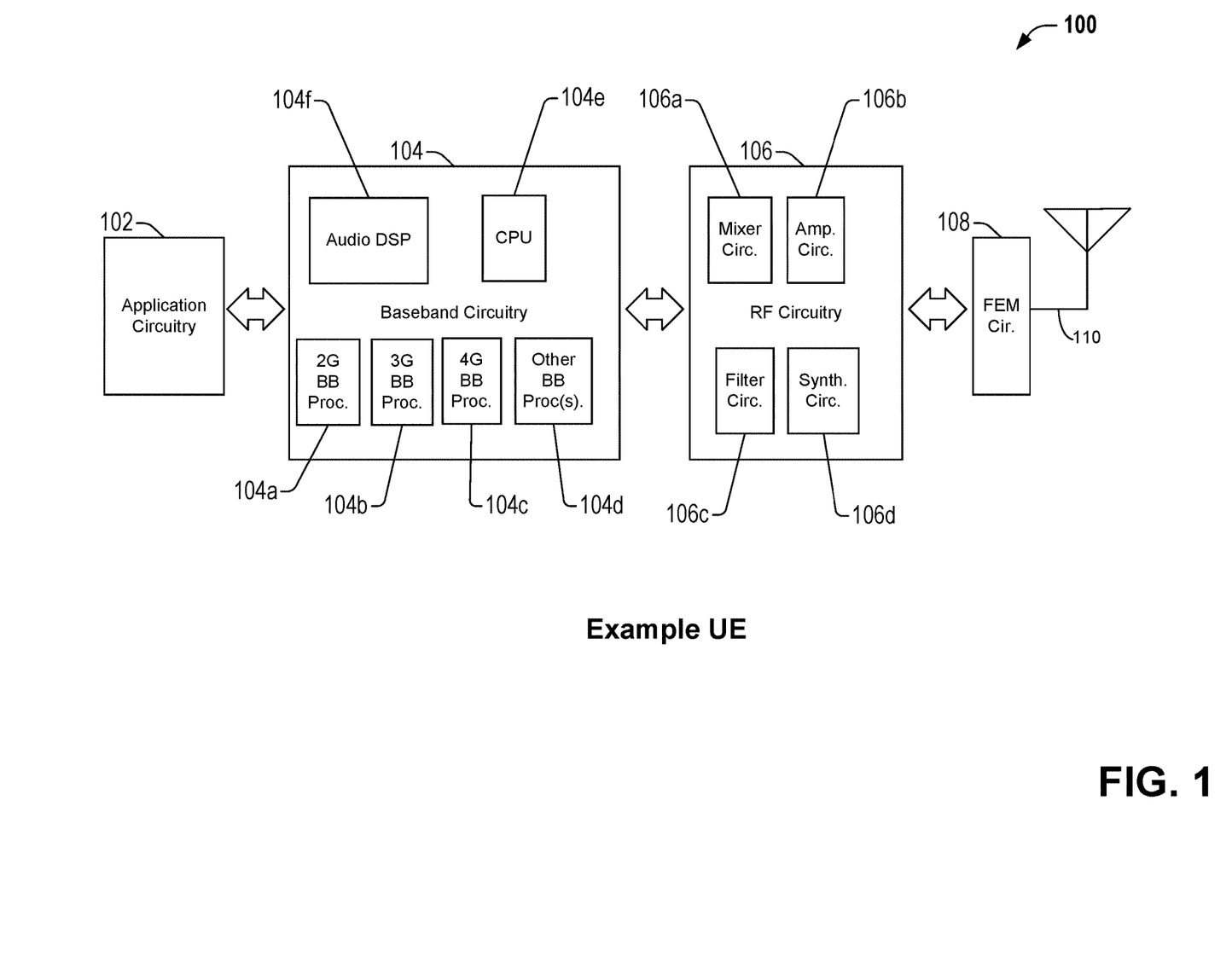
FIG. 1 is a block diagram illustrating an example user equipment (UE) useable in connection with various aspects described herein.

Embodiments described herein may be implemented into a system using any suitably configured hardware and/or software. FIG. 1 illustrates, for one embodiment, example components of a User Equipment (UE) device 100. In some embodiments, the UE device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry 106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is configured to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be configured to down-convert RF signals received from the FEM circuitry 108 based on the synthesized frequency provided by synthesizer circuitry 106d. The amplifier circuitry 106b may be configured to amplify the down-converted signals and the filter circuitry 106c may be a low-pass filter (LPF) or band-pass filter (BPF) configured to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be configured to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be configured to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry configured to operate on RF signals received from one or more antennas 110, amplify the received signals and provide the amplified versions of the received signals to the RF circuitry 106 for further processing. FEM circuitry 108 may also include a transmit signal path which may include circuitry configured to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the UE device 100 may include additional elements such as, for example, memory/storage, display, camera, sensor, and/or input/output (I/O) interface.

Additionally, although the above example discussion of device 100 is in the context of a UE device, in various aspects, a similar device can be employed in connection with a base station (BS) such as an Evolved NodeB (eNB).

Figure 2:
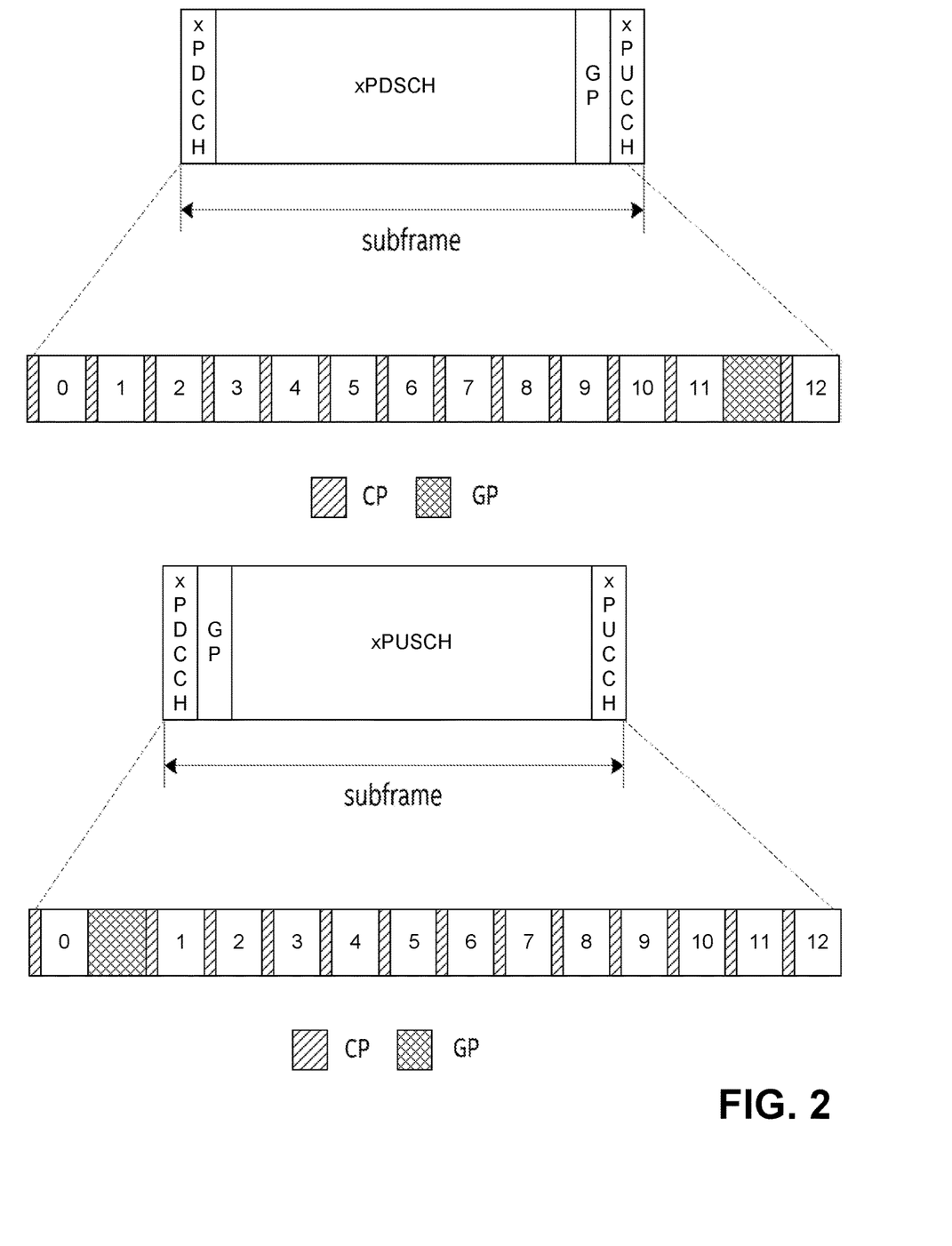
FIG. 2 is a diagram illustrating a pair of self-contained subframe structures that can be employed by a wideband system in connection with various aspects described herein.

The millimeter wave can be used in 5G (Fifth Generation) systems to achieve a wider bandwidth so that user throughput can be increased. Referring to FIG. 2, illustrated is a diagram showing a pair of self-contained subframe structures that can be employed by a wideband system in connection with various aspects described herein. New subframe structures such as the self-contained subframe structures of FIG. 2 can employ new physical layer signal designs such as the techniques described herein. The new Channel State Information Reference Signal (CSI-RS) can be designed to support the downlink (DL) Transmission (Tx) beams measurement and selection in this new frame structure, by which the massive MIMO can be applied. In addition, the new Beam Refinement Reference Signal (BRRS) can be designed to support UEs performing reception (Rx) beam direction alignment.

In various embodiments, techniques described herein can be employed that can facilitate control signaling for fifth generation Channel State Information (xCSI) Reference Signals (xCSI-RS). In aspects, control signaling discussed herein can be employed in signaling designs for xCSI-RS in new frame structures such as the self-contained subframes of FIG. 2.

Figure 3:
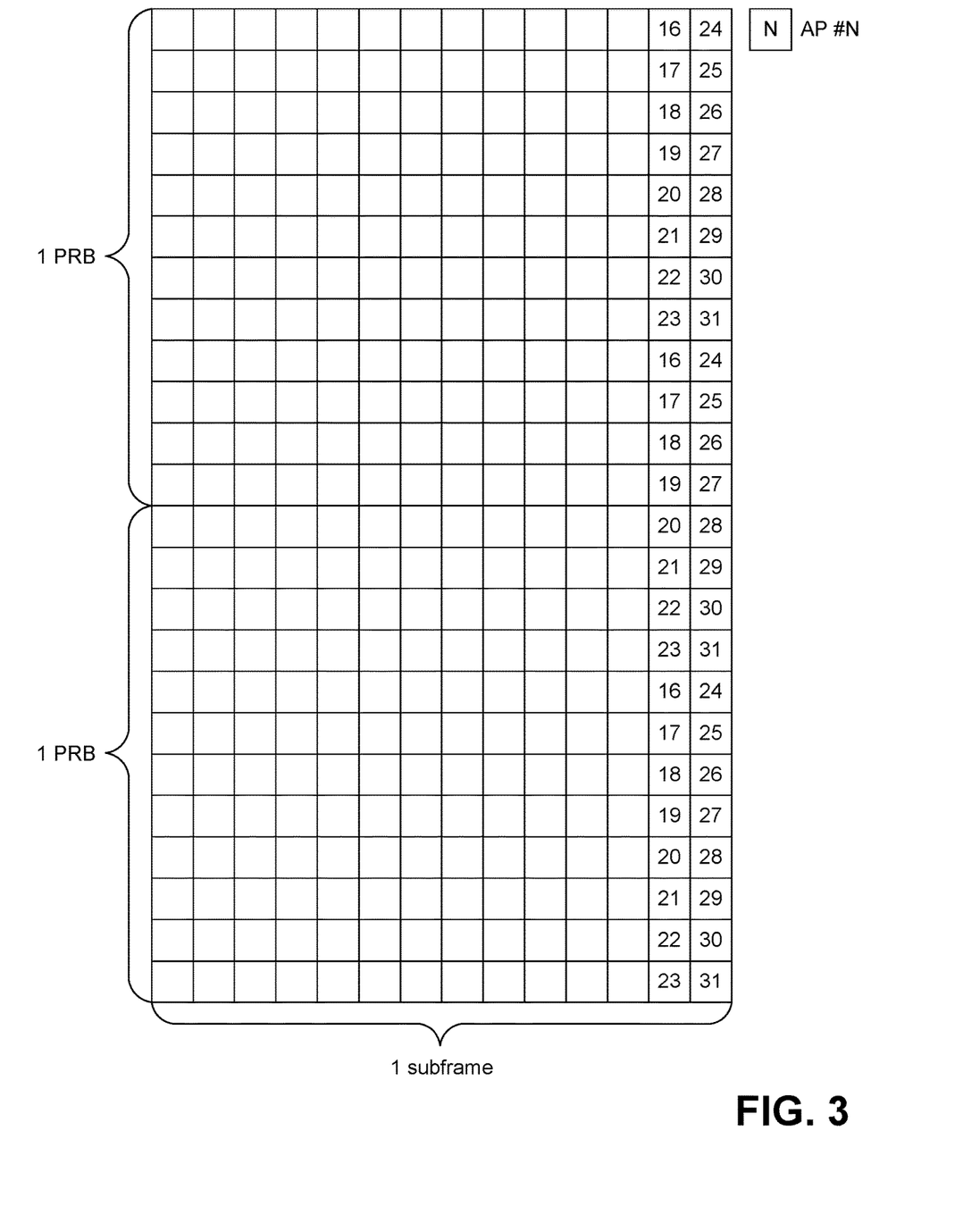
FIG. 3 is a diagram illustrating an example subframe comprising xCSI-RS according to various aspects described herein.

In 5G systems, the downlink (DL) transmission in a self-contained subframe (e.g., those shown in FIG. 2) can comprise xCSI-RS scheduled via dynamic signaling. Referring to FIG. 3, illustrated is a diagram of an example subframe comprising xCSI-RS according to various aspects described herein. In the example shown in FIG. 3, the xCSI-RS is located in the last two DL OFDM (orthogonal frequency division multiplexing) symbols. The example subframe of FIG. 3 is a DL OFDM-only subframe, where xPDCCH (5G Physical Downlink Control Channel) and xPDSCH (5G Physical Downlink Shared Channel) is transmitted without UL (uplink) transmissions. xPDCCH is used for scheduling xPDSCH, and thus xCSI-RS can be located in the end of the xPDSCH area. In example subframe of FIG. 3, symbol indices 12 and 13 are used for xCSI-RS. If there are uplink OFDM symbols or a transition gap (e.g., such as the GP (guard period) shown in the example subframes of FIG. 2) from downlink to uplink at the end of the subframe, the symbols used for xCSI-RS may be shifted earlier, for example, symbol indices 10 and 11 can be used for xCSI-RS in situations when the gap has a symbol index of 12 and the uplink symbol has an index of 13. In various aspects described herein, the location of the xCSI-RS symbols can be determined dynamically based on the subframe type, and can be indicated via xPDCCH. In other aspects, the location of xCSI-RS can be configured via higher layer (e.g., RRC (radio resource control)) signaling between possible xCSI-RS locations (e.g., (10, 11) (or a subset thereof) or (12, 13) (or a subset thereof), etc.). In various aspects, xCSI-RS can be located at the end of the xPDSCH symbols. In various embodiments wherein xCSI-RS is configured via higher layer signaling, the eNB can send xCSI-RS only in specific subframes. For example, when xCSI-RS is configured for (10, 11) via RRC, xCSI-RS can be transmitted in subframes which contain a gap in symbol 12 and uplink transmission in symbol 13, and not transmitted in subframes where xPDSCH is allocated for symbols 12 and 13.

Additionally, in various aspects, the number of symbols employed for xCSI-RS transmission can vary. The number of symbols for xCSI-RS can be configured by RRC or dynamic signaling (e.g., via xPDCCH, etc.). Depending on the number of symbols, the number of supported CSI-RS ports can be determined. In the example subframe of FIG. 3, one symbol can cover 8 antenna ports, and with two symbols, a total of 16 ports can be covered. The number of xCSI-RS ports can be configured by RRC, and the eNB can assign necessary symbols for CSI measurement, which can be done based at least in part on channel conditions.

For dynamic triggering of xCSI-RS, the DCI (downlink control information) for the triggering can include any of a variety of xCSI-RS configurations, such as the example configurations shown in Table 1, below. The configuration options can include options for xCSI-RS triggering itself since there is no xCSI-RS state, and signaling of the number of xCSI-RS symbols.

TABLE 1

CSI-RS Trigger Indication

| 3 bit CSI-RS Configuration | Indication |
| --- | --- |
| 0 | No xCSI-RS |
| 1 | One xCSI-RS symbol |
| 2 | Two xCSI-RS symbols from the same Tx beam (Same beam ID) |

TABLE 1-continued

CSI-RS Trigger Indication

| 3 bit CSI-RS Configuration | Indication |
| --- | --- |
| 3 | Two xCSI-RS symbols from different Tx beam (Different beam ID) |
| 4 | Two xCSI-RS symbols with zero powers in both symbols |
| 5 | Two xCSI-RS symbols with zero power in the second xCSI-RS symbol |
| 6 | Two xCSI-RS symbols with zero power in the first xCSI-RS symbol |
| 7 | Maintain the previous configuration |

In addition, some UEs may need to receive CSI-RS from multiple Tx (transmission) beams, for example, a best and a second best Tx beams, and in this case, the UE can feedback candidate Tx beam IDs for multiple xCSI-RS symbols. The beam IDs do not need to be for the same TP (Transmission Point), such as in CoMP (coordinated multi-point) scenarios or cell agnostic scenarios. Therefore, in the configuration, the eNB can let the UE know which beam ID, for example, for analog beam forming, is applied in each of symbols. This beam ID can correspond to xCSI-RS scrambling seed.

In addition, the option of emptying (transmitting with zero power) entire xCSI-RS symbols can facilitate accurate measurement by the UE of interference on channels. In some aspects, these configurations (zero power in some or all xCSI-RS symbols) can be indicated via the DCI. In other aspects, indication of zero-powered symbols can be configured by RRC. In various aspects, a portion of a symbol (or of two symbols) can be zero-powered, instead of the entire symbol.

In order to reduce signaling overhead in the DCI, the eNB can trigger multiple xCSI-RS across two or more subframes with the same xCSI-RS configuration. In such situations, a compact DCI format for CSI-triggering can be employed that can include one or more bits for xCSI-RS triggering, and all other dynamic parameters can be assumed to be the same as those that the UE received in the previous xCSI-RS triggering DCI (e.g., in a most recently received full DCI). In some aspects, a state for maintaining a previous xCSI-RS configuration can be included as shown in Table 1, above.

In some aspects, one or more bits can be included in a DCI of subframe n to indicate the presence of xCSI-RS in subframe n and also to trigger UCI (uplink control information) in a subsequent subframe n+k. In an example scenario involving a single bit, if it is set to 1, the xCSI-RS can be indicated in subframe n and UCI triggered in subframe n+k with no additional triggering for the UCI in any subsequent subframes. The exact subsequent subframe, which can be indexed by k, can be configured by higher layer signaling (e.g., RRC, etc.) in advance, and can be selected based at least in part on UE capabilities.

In various aspects, some or all of the following can be configured via higher layer (e.g., RRC) signaling before DCI triggering: (a) a number of CSI-RS ports for each symbol; (b) a resource index for zero-power transmission for each symbol; (c) the association of resources to VCIDs (virtual cell identities), for example, scrambling seeds (both for candidate and interference beams), wherein a directional UE can assume that a Tx beam can change if the VOID changes; (d) a feedback mode, which can indicate narrow band/wide band CQI and PMI (precoding matrix indicator), and eNB configured subband feedback or UE requested subband feedback; (e) a CQI (channel quality information) hypothesis configuration for CoMP (for example, for each hypothesis, this configuration can determine which of the TPs are transmitted and/or muted); etc.

In various aspects, an example DCI format can comprise some or all of the following for xCSI-RS: (a) CSI-RS configuration, which can be indicated via one or more (e.g., 3) bits (for example, which can indicate configurations such as in the example CSI-RS configurations of Table 2, below); (b) CSI process index which can be indicated via one or more (e.g., 2) bits. (for example, which can mapping to CSI process number as in the example mappings of Table 3, below); (c) Wideband/subband CQI, which can be indicated via 1 bit, for example, set to 0 for wideband CQI report and set to 1 for subband CQI report; (d) Wideband/subband PMI, which can be indicated via 1 bit, for example, set to 0 for wideband PMI report and set to 1 for subband PMI report; (e) Message sequence number, which can be indicated via 1 bit, for example, and need not be toggled when the CRG configuration is assumed to be unchanged; (f) CRG bitmap 1, which can be indicated via one or more (e.g., 8) bits for the first CSI-RS symbol, and can comprise a two-bit CRG type mapped to a CSI-RS type in a manner such as that shown in the example of Table 4 for each CS-RS group; (g) CRG bitmap 2, which can be indicated via one or more (e.g., 8) bits for the first CSI-RS symbol, and can comprise a two-bit CRG type mapped to a CSI-RS type in a manner such as that shown in the example of Table 4 for each CS-RS group; (h) $N_{ID}^{CSI}$ 1, which can be indicated via one or more (e.g., 3) bits, and can indicate the CSI-RS scrambling seed for the first symbol; (i) $N_{ID}^{CSI}$ 2, which can be indicated via one or more (e.g., 3) bits, and can indicate the CSI-RS scrambling seed for the first symbol; (j) Pc, which can be indicated via one or more (e.g., 4) bits, and can indicate an xPDSCH to CSI-RS power ratio such as $$\frac{xPDSCH_{EPRE}}{CSI-RS_{EPRE}} = -9 + P_c \text{ dB},$$

where $P_c \in \{0, 1, \ldots, 15\}$; and (k) Padding, which can be x bits.

TABLE 2

CSI-RS configuration

| 3 bit CSI-RS Configuration | configuration |
|---|---|
| 0 | No CSI-RS |
| 1 | One CSI-RS symbol |
| 2 | Two CSI-RS symbols from the same beam |
| 3 | Two CSI-RS symbols from different beam |
| 4 | Two CSI-RS symbols with zero powers in both symbols |
| 5 | Two CSI-RS symbols with zero power in the second CSI-RS symbol |
| 6 | Two CSI-RS symbols with zero power in the first CSI-RS symbol |
| 7 | Maintain the previous configuration |

TABLE 3

CSI process index

| CSI process Index | CSI process number |
|---|---|
| 00 | First CSI process |
| 01 | Second CSI process |

TABLE 3-continued

CSI process index

| CSI process Index | CSI process number |
|---|---|
| 10 | Third CSI process |
| 11 | — |

TABLE 4

CRG type

| CRG type | CSI-RS group type |
|---|---|
| 00 | Candidate beam measurements |
| 01 | Interfering beam measurements |
| 10 | General interference measurements |
| 11 | Disabled |

Figure 4:
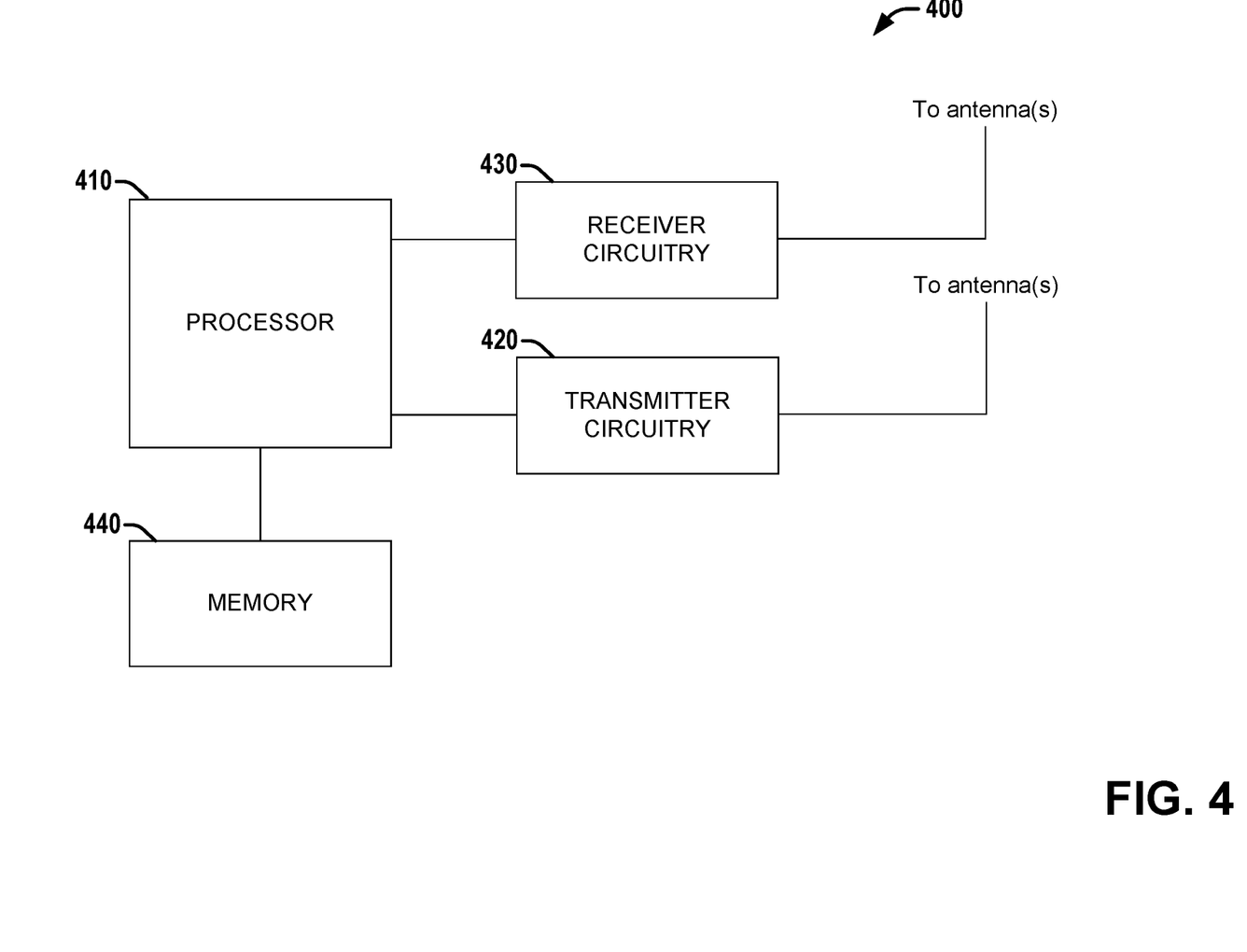
FIG. 4 is a block diagram illustrating a system that facilitates control signaling for fifth generation (5G) Channel State Information (xCSI) Reference Signals (xCSI-RSs) by a base station according to various aspects described herein.

Referring to FIG. 4, illustrated is a block diagram of a system 400 that facilitates control signaling for fifth generation (5G) Channel State Information (xCSI) Reference Signals (xCSI-RSs) by a base station according to various aspects described herein. System 400 can include a processor 410 (e.g., a baseband processor such as one of the baseband processors discussed in connection with FIG. 1), transmitter circuitry 420, receiver circuitry 430, and memory 440 (which can comprise any of a variety of storage mediums and can store instructions and/or data associated with one or more of processor 410, transmitter circuitry 420, or receiver circuitry 430). In various aspects, system 400 can be included within an Evolved Universal Terrestrial Radio Access Network (E-UTRAN) Node B (Evolved Node B, eNodeB, or eNB) or other base station in a wireless communications network. In some aspects, the processor 410, the transmitter circuitry 420, the receiver circuitry 430, and the memory 440 can be included in a single device, while in other aspects, they can be included in different devices, such as part of a distributed architecture. As described in greater detail below, system 400 can facilitate configuration of a UE to receive scheduled xCSI-RS via a 5G Physical Downlink Shared Channel (xPDSCH).

Processor 410 can schedule a xPDSCH in a subframe (e.g., subframe n), and can schedule the final M symbols (e.g., 0, 1, 2, etc.) of the xPDSCH of subframe n for xCSI-RS. Depending the type of subframe of subframe n, the final M symbols of the xPDSCH scheduled in subframe n may be the final M symbols of subframe n (e.g., symbols numbered 14-M through 13, such as if subframe n is a DL-only subframe, etc.), or may be shifted one or more symbols earlier (e.g., symbols numbered 12-M through 11, such as if subframe n is the upper example subframe of FIG. 2, wherein the xPDSCH ends at symbol 11).

Processor 410 can also generate one or more control messages that indicate an xCSI-RS configuration for subframe n, where the xCSI-RS configuration can indicate the number of xCSI-RS symbols (M), and the location of the xCSI-RS symbols (e.g., symbols (10,11), symbols (12,13), symbol (11), etc.), and can optionally indicate additional information. In some aspects, information (e.g., the value of M, the location of the M symbols, etc.) can be explicitly indicated in the one or more control messages, while in other aspects, it can be implicitly indicated (e.g., via an indication to employ a previously indicated xCSI-RS configuration, etc.). Processor 410 can output the one or more control messages to transmitter circuitry 420 for transmission to one or more UEs.

In some aspects, the one or more control messages can comprise DCI message(s) transmitted via xPDCCH of subframe n. In the same or other aspects, the one or more control messages can comprise RRC message(s).

In aspects comprising DCI message(s), at least one of the DCI message(s) can be a compact DCI message that can indicate a previous xCSI-RS configuration. In the same or other aspects, at least one of the DCI message(s) and/or RRC message(s) can comprise some or all of the information indicated herein (for example, such as a xCSI-RS configuration such as those indicated in Table 2), CSI process index (for example, as indicated in Table 3), number of CSI ports for each of the M symbols, whether the M symbols are associated with a single Tx beam or more than one Tx beam, beam index(es) of the Tx beam(s), etc.

In some aspects, a DCI message that indicates the xCSI-RS can also trigger a UCI report k subframes later (e.g., subframe n+k), where k can be selected based at least in part on capabilities of the UE. Whether triggered in this way or otherwise (e.g., via conventional techniques), processor 410 can process a CQI report received via receiver circuitry 430 from a UCI message of the UE.

In some aspects, processor 410 can generate (and transmitter circuitry 420 can transmit) xCSI-RS for some or all of the M symbols of xCSI-RS. Additionally, as can be seen in the examples of Table 1 and Table 2, in some aspects, zero transmit power can be employed for part or all of each of the M symbols, depending on the xCSI-RS configuration. For any symbols or portions thereof that the eNB employing system 400 is to operate at zero transmit power, processor 410 can set the transmit power to zero.

Figure 5:
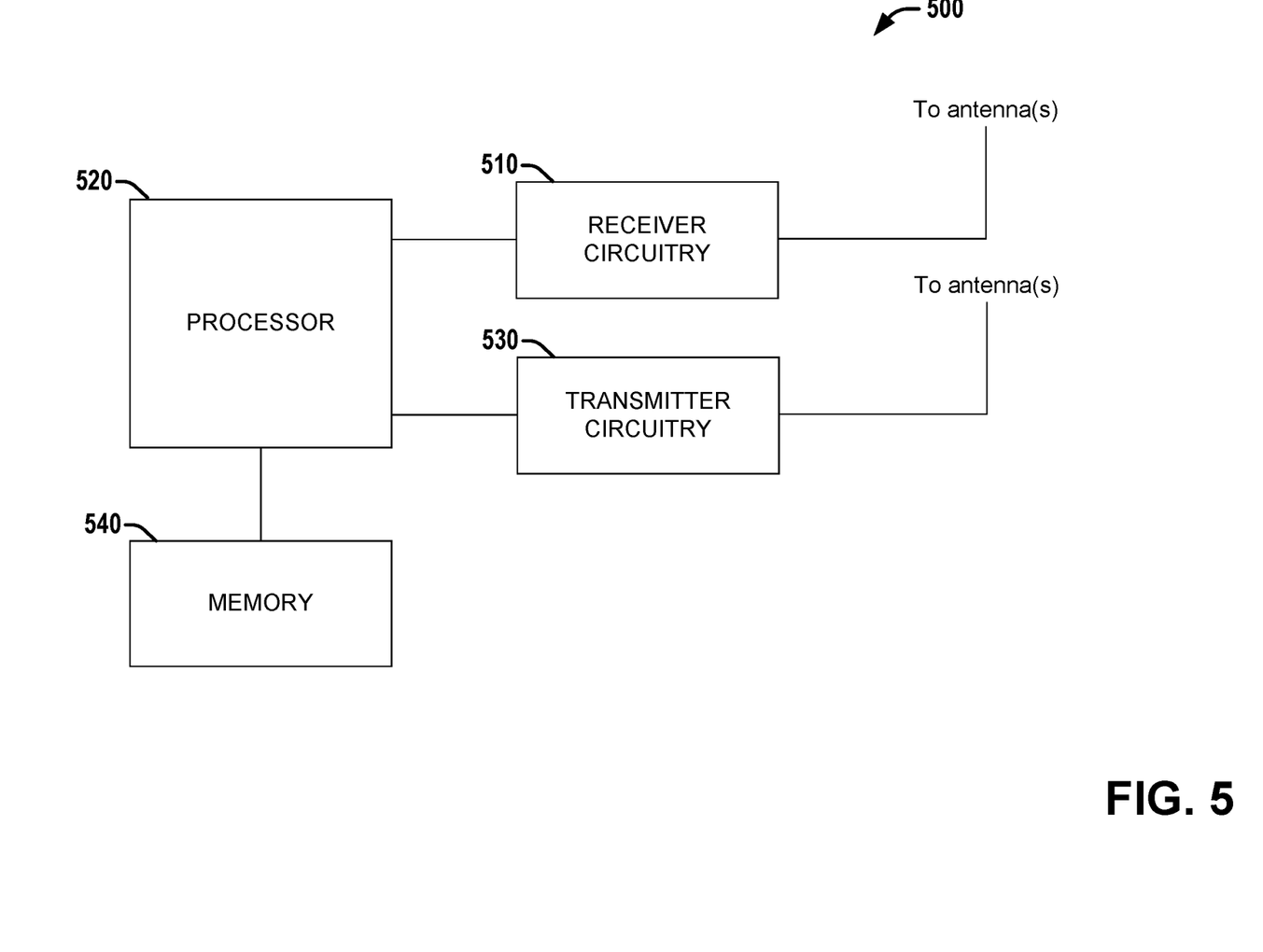
FIG. 5 is a block diagram illustrating a system that facilitates reception of control messages that configure a user equipment (UE) to receive xCSI-RS according to various aspects described herein.

Referring to FIG. 5, illustrated is a block diagram of a system 500 that facilitates reception of control messages that configure a user equipment (UE) to receive xCSI-RS according to various aspects described herein. System 500 can include receiver circuitry 510, a processor 520 (e.g., a baseband processor such as one of the baseband processors discussed in connection with FIG. 1), transmitter circuitry 530, and a memory 540 (which can comprise any of a variety of storage mediums and can store instructions and/or data associated with one or more of receiver circuitry 510, processor 520, or transmitter circuitry 530). In various aspects, system 400 can be included within a user equipment (UE). As described in greater detail below, system 500 can facilitate reception of control messages that configure the UE to receive xCSI-RS, and receiving the xCSI-RS based on the configuration.

Processor 520 can process a set of one or more xCSI-RS configuration messages (e.g., DCI message(s) and/or RRC message(s)) received via receiver circuitry 510. Based on the received set of xCSI-RS configuration messages, processor 520 can determine xCSI-RS configuration parameters for a given subframe (e.g., subframe n). These xCSI-RS configuration parameters can comprise one or more of the characteristics indicated herein as configurable for xCSI-RS, such as the number of symbols for xCSI-RS (e.g., M=0, 1, 2, etc.), which symbols are configured for xCSI-RS, CRG type (e.g., candidate beam measurement, interference measurement, etc.), whether xCSI-RS will be received from one or more Tx beams that can be from one or more TPs, etc. In some aspects, the set of xCSI-RS configuration messages can comprise a compact format DCI message that indicates that the xCSI-RS configuration parameters remain the same as previously configured.

Based on the xCSI-RS configuration parameters, processor 520 can process a set of xCSI-RS signals received via receiver circuitry 510 during subframe n (e.g., via the last M symbols of the xPDSCH of subframe n). From the processed xCSI-RS symbols, processor 520 can generate a CSI report that indicates one or more CSI parameters (e.g., CQI, PMI, RI, etc.) associated with one or more Tx beams, which processor 520 can output for transmission by transmitter circuitry 530 as part of a UCI message sent via subframe n+k.

In some aspects, the UCI message comprising the CSI report can be triggered via a DCI message received by received circuitry 510 in subframe n, which indicates that a UCI report should be triggered k subframes later, wherein k can be based at least in part on capabilities of the UE implementing system 500.

Figure 6:
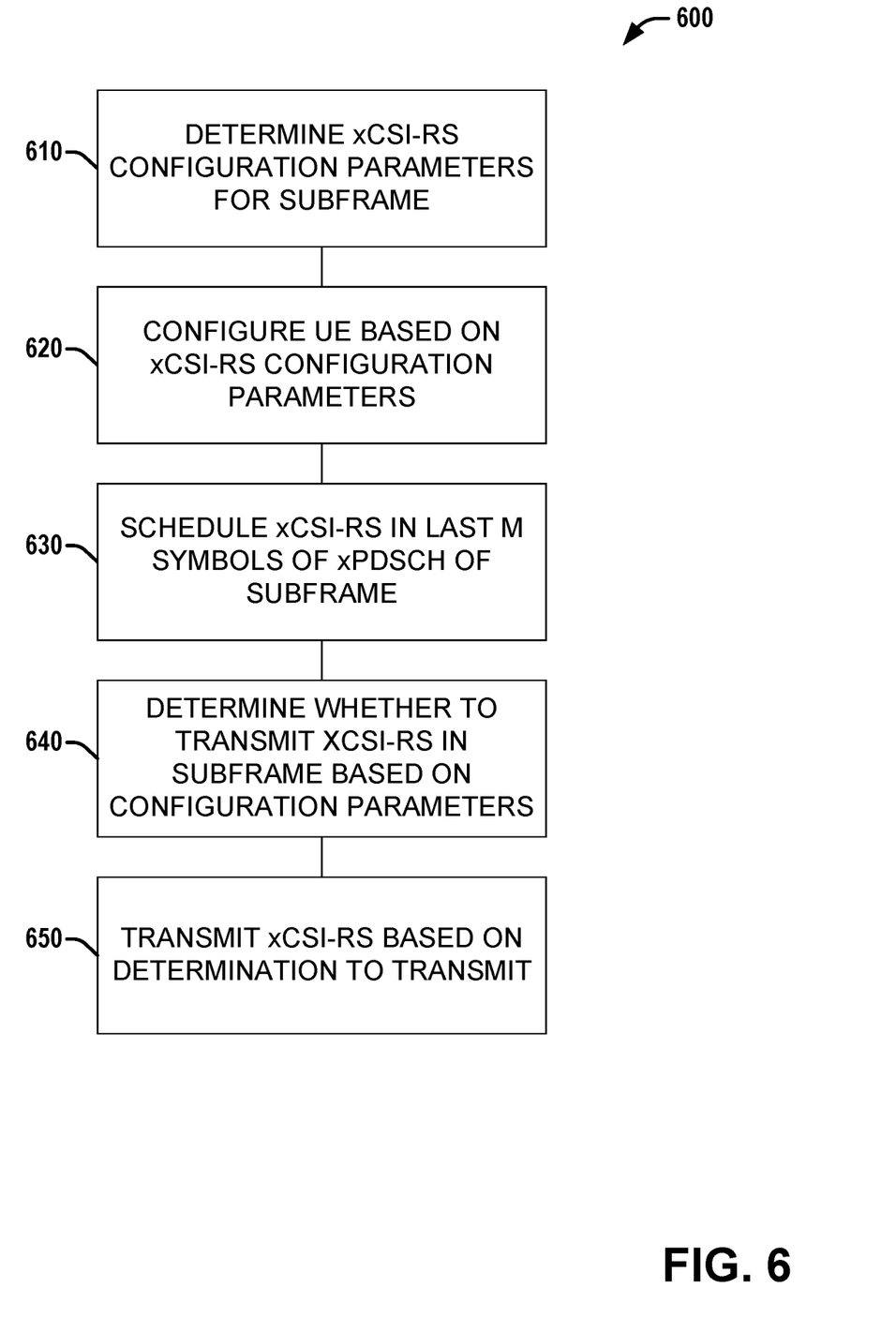
FIG. 6 is a flow diagram illustrating a method that facilitates generation of one or more control messages by a base station to configure a UE to receive xCSI-RS during a subframe, according to various aspects described herein.

Referring to FIG. 6, illustrated is a flow diagram of a method 600 that facilitates generation of one or more control messages by a base station to configure a UE to receive xCSI-RS during a subframe, according to various aspects described herein. In some aspects, method 600 can be performed at an eNB. In other aspects, a machine readable medium can store instructions associated with method 600 that, when executed, can cause an eNB to perform the acts of method 600.

At 610, a set of xCSI-RS configuration parameters for a subframe n can be determined, which can include a determination of a number of symbols (M) for xCSI-RS, which symbols to assign to xCSI-RS, whether the M symbols are associated with a common Tx beam or two or more distinct Tx beams, whether the M symbols are associated with Tx beams from a common TP or two or more distinct TPs, whether part or all of one or more of the M symbols are to have a zero transmit power, etc.

At 620, one or more control messages (e.g., DCI and/or RRC message(s)) can be transmitted to a UE to configure the UE based on the set of xCSI-RS configuration parameters. The UE can be configured explicitly by parameters indicated via the set of control messages, or implicitly via reference to a previous configuration, such as via one or more bits of a compact DCI format message.

At 630, xCSI-RS can be scheduled in the last M symbols of xPDSCH of subframe n. In some aspects, where the xCSI-RS configuration parameters were indicated via RRC message and the subframe structure of subframe n does not have the final M symbols of xPDSCH aligned with the M symbols indicated via RRC as assigned to xCSI-RS (e.g., the final two symbols of xPDSCH are (10, 11) and xCSI-RS was scheduled for symbols (12, 13), or vice versa), xCSI-RS can be omitted from subframe n.

At 640, a determination can be made whether to transmit xCSI-RS during one or more of the M symbols for xCSI-RS in subframe n. For example, each of the M symbols can be associated with a Tx beam from a different TP, and thus no xCSI-RS is to be transmitted. As another example, a determination can be made to set a transmit power to zero for one or more of the M symbols (or portions thereof) of xCSI-RS.

At 650, if a determination was made to transmit xCSI-RS during part or all of at least one of the M symbols for xCSI-RS, xCSI-RS can be transmitted during the appropriate symbols or portions thereof.

Figure 7:
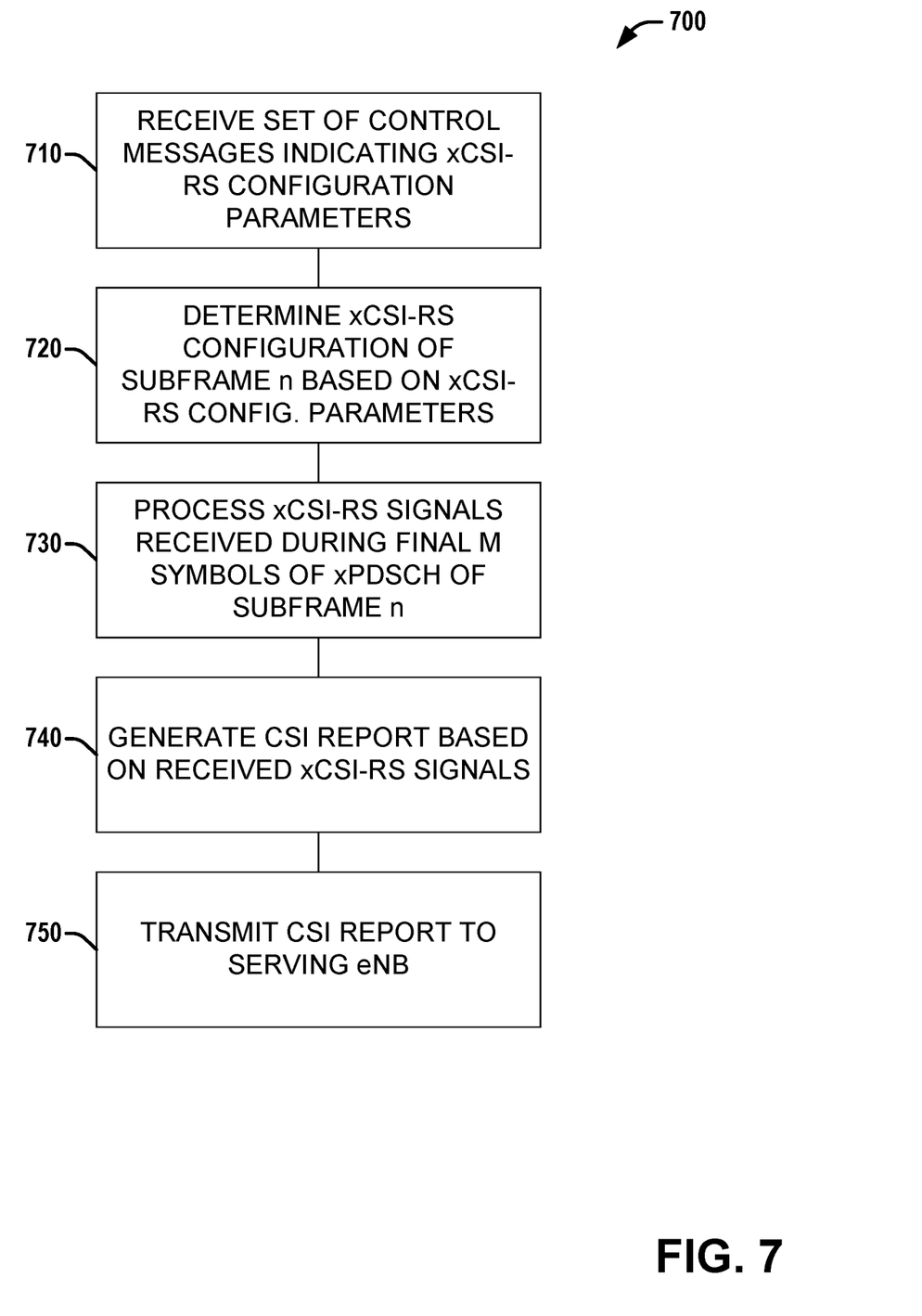
FIG. 7 is a flow diagram illustrating a method that facilitates reception of one or more control messages by a UE to configure the UE to for xCSI-RS during a subframe, according to various aspects described herein.

Referring to FIG. 7, illustrated is a flow diagram of a method 700 that facilitates reception of one or more control messages by a UE to configure the UE to for xCSI-RS during a subframe, according to various aspects described herein. In some aspects, method 700 can be performed at a UE. In other aspects, a machine readable medium can store instructions associated with method 700 that, when executed, can cause a UE to perform the acts of method 700.

At 710, a set of control messages (e.g., DCI message(s) and/or RRC message(s)) can be received, wherein the set of control messages can indicate a set of xCSI-RS configuration parameters for a subframe n, either explicitly or implicitly (e.g., via reference to a previous configuration).

At 720, an xCSI-RS configuration for subframe n can be determined based on the received set of control messages, which can indicate a number (M) of symbols for xCSI-RS, which M symbols are assigned to xCSI-RS, whether the M symbols are associated with one or more Tx beams from one or more TPs, etc.

At 730, xCSI-RS signals can received during the final M symbols of xPDSCH of subframe n, based on the xCSI-RS configuration for subframe n.

At 740, a CSI report can be generated that indicates one or more CSI parameters (e.g., CQI, PMI, etc.) based on the received xCSI-RS signals.

At 750, the CSI report can be transmitted to a serving eNB.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

Example 1 is an apparatus configured to be employed within an Evolved NodeB (eNB), comprising a processor configured to: schedule a fifth generation Physical Downlink Shared Channel (xPDSCH) during one or more xPDSCH symbols of a subframe n; schedule a final M symbols of the one or more xPDSCH symbols for fifth generation Channel State Information Reference Signals (xCSI-RS); and output one or more control messages to transmitter circuitry for transmission to one or more User Equipments (UEs), wherein the one or more control messages comprise a xCSI-RS configuration for the one or more UEs, wherein the xCSI-RS configuration indicates the value of M and the final M symbols scheduled for xCSI-RS.

Example 2 comprises the subject matter of any variation of example 1, wherein the one or more control messages comprise one or more downlink control information (DCI) messages output to the transmitter circuitry for transmission to the one or more UEs via a fifth generation Physical Downlink Control Channel (xPDCCH) of the subframe n.

Example 3 comprises the subject matter of any variation of example 2, wherein a first DCI message of the one or more DCI messages indicates to a first UE of the one or more UEs that the xCSI-RS configuration is a previously indicated xCSI-RS configuration.

Example 4 comprises the subject matter of any variation of example 3, wherein the first DCI message has a compact DCI format.

Example 5 comprises the subject matter of any variation of example 1, wherein the one or more control messages comprise one or more radio resource control (RRC) messages output to the transmitter circuitry for transmission to the one or more UEs.

Example 6 comprises the subject matter of any variation of example 5, wherein the one or more RRC messages configure a number of CSI-RS ports for each of the final M symbols scheduled for xCSI-RS and configure the number of xCSI-RS symbols, M.

Example 7 comprises the subject matter of any variation of any of examples 1-6, wherein the processor is further configured to process a first Channel Quality Information (CQI) report from a first Uplink Control Information (UCI) message received via receiver circuitry from a first UE of the one or more UEs during a subframe n+k that is k subframes after the subframe n.

Example 8 comprises the subject matter of any variation of example 7, wherein the one or more control messages comprise a first downlink control information (DCI) message output for transmission via subframe n, wherein the first DCI message indicates to the first UE to trigger the first UCI message during the subframe n+k.

Example 9 comprises the subject matter of any variation of example 8, wherein the value of k is configured via higher signaling for the first UE based on capabilities of the first UE.

Example 10 comprises the subject matter of any variation of any of examples 1-6, wherein the processor is further configured to set a transmit power of the transmitter circuitry to zero for at least a portion of at least one symbol of the final M symbols scheduled for xCSI-RS, wherein the at least one symbol of the final M symbols is indicated via the one or more control messages.

Example 11 comprises the subject matter of any variation of any of examples 1-6, wherein M is at least two, and wherein the one or more control messages indicate whether each of the final M symbols are beamformed from a common beam or from two or more different beams.

Example 12 comprises the subject matter of any variation of any of examples 1-4, wherein the one or more control messages comprise one or more radio resource control (RRC) messages output to the transmitter circuitry for transmission to the one or more UEs.

Example 13 comprises the subject matter of any variation of example 12, wherein the one or more RRC messages configure a number of CSI-RS ports for each of the final M symbols scheduled for xCSI-RS and configure the number of xCSI-RS symbols, M.

Example 14 comprises the subject matter of any variation of any of examples 1-4 or 12-13, wherein the processor is further configured to process a first Channel Quality Information (CQI) report from a first Uplink Control Information (UCI) message received via receiver circuitry from a first UE of the one or more UEs during a subframe n+k that is k subframes after the subframe n.

Example 15 comprises the subject matter of any variation of example 14, wherein the one or more control messages comprise a first downlink control information (DCI) message output for transmission via subframe n, wherein the first DCI message indicates to the first UE to trigger the first UCI message during the subframe n+k.

Example 16 comprises the subject matter of any variation of example 15, wherein the value of k is configured via higher signaling for the first UE based on capabilities of the first UE.

Example 17 comprises the subject matter of any variation of any of examples 1-4 or 12-16, wherein the processor is further configured to set a transmit power of the transmitter circuitry to zero for at least a portion of at least one symbol of the final M symbols scheduled for xCSI-RS, wherein the at least one symbol of the final M symbols is indicated via the one or more control messages.

Example 18 comprises the subject matter of any variation of example 1, wherein the processor is further configured to process a first Channel Quality Information (CQI) report from a first Uplink Control Information (UCI) message received via receiver circuitry from a first UE of the one or more UEs during a subframe n+k that is k subframes after the subframe n.

Example 19 comprises the subject matter of any variation of example 1, wherein the processor is further configured to set a transmit power of the transmitter circuitry to zero for at least a portion of at least one symbol of the final M symbols scheduled for xCSI-RS, wherein the at least one symbol of the final M symbols is indicated via the one or more control messages.

Example 20 comprises the subject matter of any variation of example 1, wherein M is at least two, and wherein the one or more control messages indicate whether each of the final M symbols are beamformed from a common beam or from two or more different beams.

Example 21 is a machine readable medium comprising instructions that, when executed, cause an Evolved NodeB (eNB) to: determine a set of fifth generation Channel State Information Reference Signal (xCSI-RS) configuration parameters, wherein the set of xCSI-RS configuration parameters indicate a number of symbols, M, for xCSI-RS, wherein M is two or fewer; configure one or more user equipments (UEs) based on the set of xCSI-RS configuration parameters via a set of control messages; schedule xCSI-RS signals in the last M symbols of a fifth generation Physical Downlink Shared Channel (xPDSCH) in a subframe n; make a determination whether to transmit xCSI-RS in the subframe n based at least in part on the set of xCSI-RS configuration parameters; and transmit xCSI-RS via one or two of the last M symbols of the xPDSCH in response to a determination being made to transmit xCSI-RS in the subframe n.

Example 22 comprises the subject matter of any variation of example 21, wherein the set of xCSI-RS configuration parameters comprise a xCSI-RS configuration field that indicates the value of M.

Example 23 comprises the subject matter of any variation of example 22, wherein M is 2.

Example 24 comprises the subject matter of any variation of example 23, wherein all of the last M symbols of the xPDSCH are scheduled for xCSI-RS signals associated with a common transmit beam.

Example 25 comprises the subject matter of any variation of example 23, wherein each of the last M symbols of the xPDSCH are scheduled for xCSI-RS signals associated with distinct transmit beams.

Example 26 comprises the subject matter of any variation of example 23, wherein the instructions, when executed, further cause the eNB to set a transmit power to zero for at least one of the last M symbols of the xPDSCH.

Example 27 comprises the subject matter of any variation of any of examples 21-26, wherein the set of control messages comprise a set of radio resource control (RRC) messages.

Example 28 comprises the subject matter of any variation of example 27, wherein the instructions, when executed, further cause the eNB to make a determination to not transmit xCSI-RS in the subframe n based at least in part on a subframe structure of the subframe n.

Example 29 comprises the subject matter of any variation of any of examples 21-26, wherein the set of control messages comprise a set of downlink control information (DCI) messages.

Example 30 comprises the subject matter of any variation of example 29, wherein a first DCI message of the set of DCI messages has a compact DCI format and indicates that the set of xCSI-RS configuration parameters are the same as a set of previously configured xCSI-RS configuration parameters.

Example 31 comprises the subject matter of any variation of example 21, wherein the set of control messages comprise a set of radio resource control (RRC) messages.

Example 32 comprises the subject matter of any variation of example 21, wherein the set of control messages comprise a set of downlink control information (DCI) messages.

Example 33 is an apparatus configured to be employed within a User Equipment (UE), comprising a processor configured to: process one or more fifth generation Channel State Information Reference Signal (xCSI-RS) configuration messages received via receiver circuitry; determine a set of xCSI-RS configuration parameters for a subframe n based at least in part on the one or more xCSI-RS configuration messages, wherein the set of xCSI-RS configuration parameters indicate a number of symbols, M, associated with xCSI-RS in the subframe n and indicate which M symbols are associated with xCSI-RS in the subframe n, wherein the M symbols are a final M symbols of a fifth generation Physical Downlink Shared Channel (xPDSCH) in the subframe n; process xCSI-RS signals received via the receiver circuitry during the M symbols associated with xCSI-RS in the subframe n; generate a channel state information (CSI) report based on the processed xCSI-RS signals received during the M symbols associated with xCSI-RS in the subframe n; and output the CSI report to transmitter circuitry for transmission to an Evolved NodeB (eNB).

Example 34 comprises the subject matter of any variation of example 33, wherein the one or more xCSI-RS configuration messages comprise one or more downlink control information (DCI) messages.

Example 35 comprises the subject matter of any variation of example 34, wherein a first DCI message of the one or more DCI messages indicates that the set of xCSI-RS configuration parameters for the subframe n are the same as a previously configured set of xCSI-RS configuration parameters.

Example 36 comprises the subject matter of any variation of example 33, wherein the one or more xCSI-RS configuration messages comprise one or more radio resource control (RRC) messages.

Example 37 comprises the subject matter of any variation of any of examples 33-36, wherein M is 2.

Example 38 comprises the subject matter of any variation of any of examples 33-36, wherein each of the M symbols associated with xCSI-RS in the subframe n are associated with a common transmit beam.

Example 39 comprises the subject matter of any variation of any of examples 33-36, wherein each of the M symbols associated with xCSI-RS in the subframe n are associated with a distinct transmit beam.

Example 40 comprises the subject matter of any variation of example 39, wherein each of the M symbols associated with xCSI-RS in the subframe n are associated with a transmit beam from a distinct transmission point.

Example 41 comprises the subject matter of any variation of any of examples 33-36, wherein the CSI report is output to the transmitter circuitry for transmission via a subframe n+k that is k subframes after the subframe n, wherein the value of k is indicated via a first xCSI-RS configuration message of the one or more xCSI-RS configuration messages and is based on capabilities of the UE.

Example 42 comprises the subject matter of any variation of any of examples 33-38, wherein each of the M symbols associated with xCSI-RS in the subframe n are associated with a distinct transmit beam.

Example 43 comprises the subject matter of any variation of any of examples 33-40 or 42, wherein the CSI report is output to the transmitter circuitry for transmission via a subframe n+k that is k subframes after the subframe n, wherein the value of k is indicated via a first xCSI-RS configuration message of the one or more xCSI-RS configuration messages and is based on capabilities of the UE.

Example 44 is an apparatus configured to be employed within an Evolved NodeB (eNB), comprising means for processing configured to: determine a set of fifth generation Channel State Information Reference Signal (xCSI-RS) configuration parameters, wherein the set of xCSI-RS configuration parameters indicate a number of symbols, M, for xCSI-RS, wherein M is two or fewer; configure one or more user equipments (UEs) based on the set of xCSI-RS configuration parameters via a set of control messages; schedule xCSI-RS signals in the last M symbols of a fifth generation Physical Downlink Shared Channel (xPDSCH) in a subframe n; and make a determination whether to transmit xCSI-RS in the subframe n based at least in part on the set of xCSI-RS configuration parameters; and means for transmitting configured to transmit xCSI-RS via one or two of the last M symbols of the xPDSCH in response to a determination being made to transmit xCSI-RS in the subframe n.

Example 45 comprises the subject matter of any variation of example 44, wherein the set of xCSI-RS configuration parameters comprise a xCSI-RS configuration field that indicates the value of M.

Example 46 comprises the subject matter of any variation of example 45, wherein M is 2.

Example 47 comprises the subject matter of any variation of example 46, wherein all of the last M symbols of the xPDSCH are scheduled for xCSI-RS signals associated with a common transmit beam.

Example 48 comprises the subject matter of any variation of example 46, wherein each of the last M symbols of the xPDSCH are scheduled for xCSI-RS signals associated with distinct transmit beams.

Example 49 comprises the subject matter of any variation of example 46, wherein the means for transmitting is further configured to set a transmit power to zero for at least one of the last M symbols of the xPDSCH.

Example 50 comprises the subject matter of any variation of any of examples 44-49, wherein the set of control messages comprise a set of radio resource control (RRC) messages.

Example 51 comprises the subject matter of any variation of example 50, wherein the means for processing is further configured to make a determination to not transmit xCSI-RS in the subframe n based at least in part on a subframe structure of the subframe n.

Example 52 comprises the subject matter of any variation of any of examples 44-49, wherein the set of control messages comprise a set of downlink control information (DCI) messages.

Example 53 comprises the subject matter of any variation of example 52, wherein a first DCI message of the set of DCI messages has a compact DCI format and indicates that the set of xCSI-RS configuration parameters are the same as a set of previously configured xCSI-RS configuration parameters.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed within an Evolved NodeB (eNB), comprising:
   a processor configured to:
      schedule a fifth generation Physical Downlink Shared Channel (xPDSCH) during one or more xPDSCH symbols of a subframe n;
      schedule a final M symbols of the one or more xPDSCH symbols for fifth generation Channel State Information Reference Signals (xCSI-RS); and
      output one or more control messages to transmitter circuitry for transmission to one or more User Equipments (UEs), wherein the one or more control messages comprise a xCSI-RS configuration for the one or more UEs, wherein the xCSI-RS configuration indicates the value of M and the final M symbols scheduled for xCSI-RS.

2. The apparatus of claim 1, wherein the one or more control messages comprise one or more downlink control information (DCI) messages output to the transmitter circuitry for transmission to the one or more UEs via a fifth generation Physical Downlink Control Channel (xPDCCH) of the subframe n.

3. The apparatus of claim 2, wherein a first DCI message of the one or more DCI messages indicates to a first UE of the one or more UEs that the xCSI-RS configuration is a previously indicated xCSI-RS configuration.

4. The apparatus of claim 3, wherein the first DCI message has a compact DCI format.

5. The apparatus of claim 1, wherein the one or more control messages comprise one or more radio resource control (RRC) messages output to the transmitter circuitry for transmission to the one or more UEs.

6. The apparatus of claim 5, wherein the one or more RRC messages configure a number of CSI-RS ports for each of the final M symbols scheduled for xCSI-RS and configure the number of xCSI-RS symbols, M.

7. The apparatus of claim 1, wherein the processor is further configured to process a first Channel Quality Information (CQI) report from a first Uplink Control Information (UCI) message received via receiver circuitry from a first UE of the one or more UEs during a subfame n+k that is k subframes after the subframe n.

8. The apparatus of claim 7, wherein the one or more control messages comprise a first downlink control information (DCI) message output for transmission via subframe n, wherein the first DCI message indicates to the first UE to trigger the first UCI message during the subframe n+k.

9. The apparatus of claim 8, wherein the value of k is configured via higher signaling for the first UE based on capabilities of the first UE.

10. The apparatus of claim 1, wherein the processor is further configured to set a transmit power of the transmitter circuitry to zero for at least a portion of at least one symbol of the final M symbols scheduled for xCSI-RS, wherein the at least one symbol of the final M symbols is indicated via the one or more control messages.

11. The apparatus of claim 1, wherein M is at least two, and wherein the one or more control messages indicate whether each of the final M symbols are beamformed from a common beam or from two or more different beams.

12. A non-transitory machine readable medium comprising instructions that, when executed, cause an Evolved NodeB (eNB) to:
determine a set of fifth generation Channel State Information Reference Signal (xCSI-RS) configuration parameters, wherein the set of xCSI-RS configuration parameters indicate a number of symbols, M, for xCSI-RS, wherein M is two or fewer;
configure one or more user equipments (UEs) based on the set of xCSI-RS configuration parameters via a set of control messages;
schedule xCSI-RS signals in the last M symbols of a fifth generation Physical Downlink Shared Channel (xPDSCH) in a subframe n;
make a determination whether to transmit xCSI-RS in the subframe n based at least in part on the set of xCSI-RS configuration parameters; and
transmit xCSI-RS via one or two of the last M symbols of the xPDSCH in response to a determination being made to transmit xCSI-RS in the subframe n.

13. The machine readable medium of claim 12, wherein the set of xCSI-RS configuration parameters comprise a xCSI-RS configuration field that indicates the value of M.

14. The machine readable medium of claim 13, wherein M is 2.

15. The machine readable medium of claim 14, wherein all of the last M symbols of the xPDSCH are scheduled for xCSI-RS signals associated with a common transmit beam.

16. The machine readable medium of claim 14, wherein each of the last M symbols of the xPDSCH are scheduled for xCSI-RS signals associated with distinct transmit beams.

17. The machine readable medium of claim 14, wherein the instructions, when executed, further cause the eNB to set a transmit power to zero for at least one of the last M symbols of the xPDSCH.

18. The machine readable medium of claim 12, wherein the set of control messages comprise a set of radio resource control (RRC) messages.

19. The machine readable medium of claim 18, wherein the instructions, when executed, further cause the eNB to make a determination to not transmit xCSI-RS in the subframe n based at least in part on a subframe structure of the subframe n.

20. The machine readable medium of claim 12, wherein the set of control messages comprise a set of downlink control information (DCI) messages.

21. The machine readable medium of claim 20, wherein a first DCI message of the set of DCI messages has a compact DCI format and indicates that the set of xCSI-RS configuration parameters are the same as a set of previously configured xCSI-RS configuration parameters.

22. An apparatus configured to be employed within a User Equipment (UE), comprising:
a processor configured to:
process one or more fifth generation Channel State Information Reference Signal (xCSI-RS) configuration messages received via receiver circuitry;
determine a set of xCSI-RS configuration parameters for a subframe n based at least in part on the one or more xCSI-RS configuration messages, wherein the set of xCSI-RS configuration parameters indicate a number of symbols, M, associated with xCSI-RS in the subframe n and indicate which M symbols are associated with xCSI-RS in the subframe n, wherein the M symbols are a final M symbols of a fifth generation Physical Downlink Shared Channel (xPDSCH) in the subframe n;
process xCSI-RS signals received via the receiver circuitry during the M symbols associated with xCSI-RS in the subframe n;
generate a channel state information (CSI) report based on the processed xCSI-RS signals received during the M symbols associated with xCSI-RS in the subframe n; and
output the CSI report to transmitter circuitry for transmission to an Evolved NodeB (eNB).

23. The apparatus of claim 22, wherein the one or more xCSI-RS configuration messages comprise one or more downlink control information (DCI) messages.

24. The apparatus of claim 23, wherein a first DCI message of the one or more DCI messages indicates that the set of xCSI-RS configuration parameters for the subframe n are the same as a previously configured set of xCSI-RS configuration parameters.

25. The apparatus of claim 22, wherein the one or more xCSI-RS configuration messages comprise one or more radio resource control (RRC) messages.

26. The apparatus of claim 22, wherein M is 2.

27. The apparatus of claim 22, wherein each of the M symbols associated with xCSI-RS in the subframe n are associated with a common transmit beam.

28. The apparatus of claim 22, wherein each of the M symbols associated with xCSI-RS in the subframe n are associated with a distinct transmit beam.

29. The apparatus of claim 28, wherein each of the M symbols associated with xCSI-RS in the subframe n are associated with a transmit beam from a distinct transmission point.

30. The apparatus of claim 22, wherein the CSI report is output to the transmitter circuitry for transmission via a subfame n+k that is k subframes after the subframe n, wherein the value of k is indicated via a first xCSI-RS configuration message of the one or more xCSI-RS configuration messages and is based on capabilities of the UE.

* * * * *